United States Patent [19]
Heigl

[11] Patent Number: 5,831,442
[45] Date of Patent: Nov. 3, 1998

[54] HANDLING DEVICE

[76] Inventor: Helmuth Heigl, Anemonenstrasse 3A, D-83059 Kolbermoor, Germany

[21] Appl. No.: 645,244

[22] Filed: May 13, 1996

[30]    Foreign Application Priority Data

May 11, 1995  [DE]  Germany .......................... 195 17 330.9

[51] Int. Cl.$^6$ .................................................. G01R 31/22
[52] U.S. Cl. ............................................................ 324/754
[58] Field of Search ..................................... 324/754, 755, 324/756, 761; 439/482; 414/590, 744.3, 744.5; 73/866.5

[56]           References Cited

U.S. PATENT DOCUMENTS

| | | | |
|---|---|---|---|
| 4,383,217 | 5/1983 | Shiell . | |
| 4,527,942 | 7/1985 | Smith | 324/758 |
| 4,588,346 | 5/1986 | Smith | 324/758 |
| 4,875,005 | 10/1989 | Terada et al. | 414/758 |
| 4,979,093 | 12/1990 | Laine et al. | 901/14 |

FOREIGN PATENT DOCUMENTS 36 17 741C2  5/1993  Germany .

*Primary Examiner*—Vinh P. Nguyen
*Attorney, Agent, or Firm*—Herbert L. Lerner; Laurence A. Greenberg

[57]              ABSTRACT

A handling device, in particular for handling probes of a wafer testing device, includes a receiving device for a probe being disposed in such a way as to be adjustable in a vertical direction and in a horizontal direction relative to at least one vertical bearer. The receiving device is guided adjustably in a horizontal direction on a supporting part. The supporting part is guided adjustably in a vertical direction on the at least one vertical bearer. Furthermore, a counterweight device is constructed so as to counterbalance the weight of the probe, the receiving device and the supporting part. The counterweight device includes a carrying device for receiving counterbalance weights. The carrying device is aligned horizontally and for parallel motion includes at least three suspension devices for fixing a connector which is turned round associated guide pulleys and is connected to the supporting part.

27 Claims, 10 Drawing Sheets

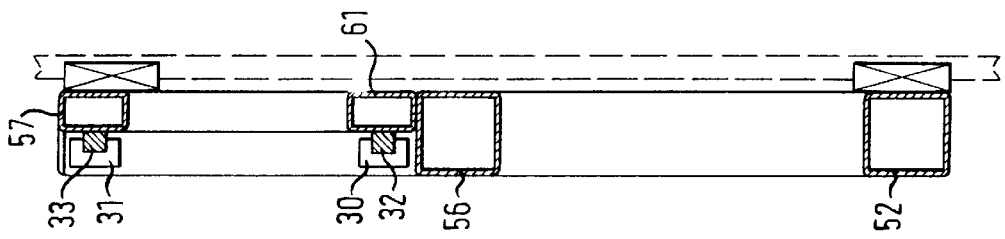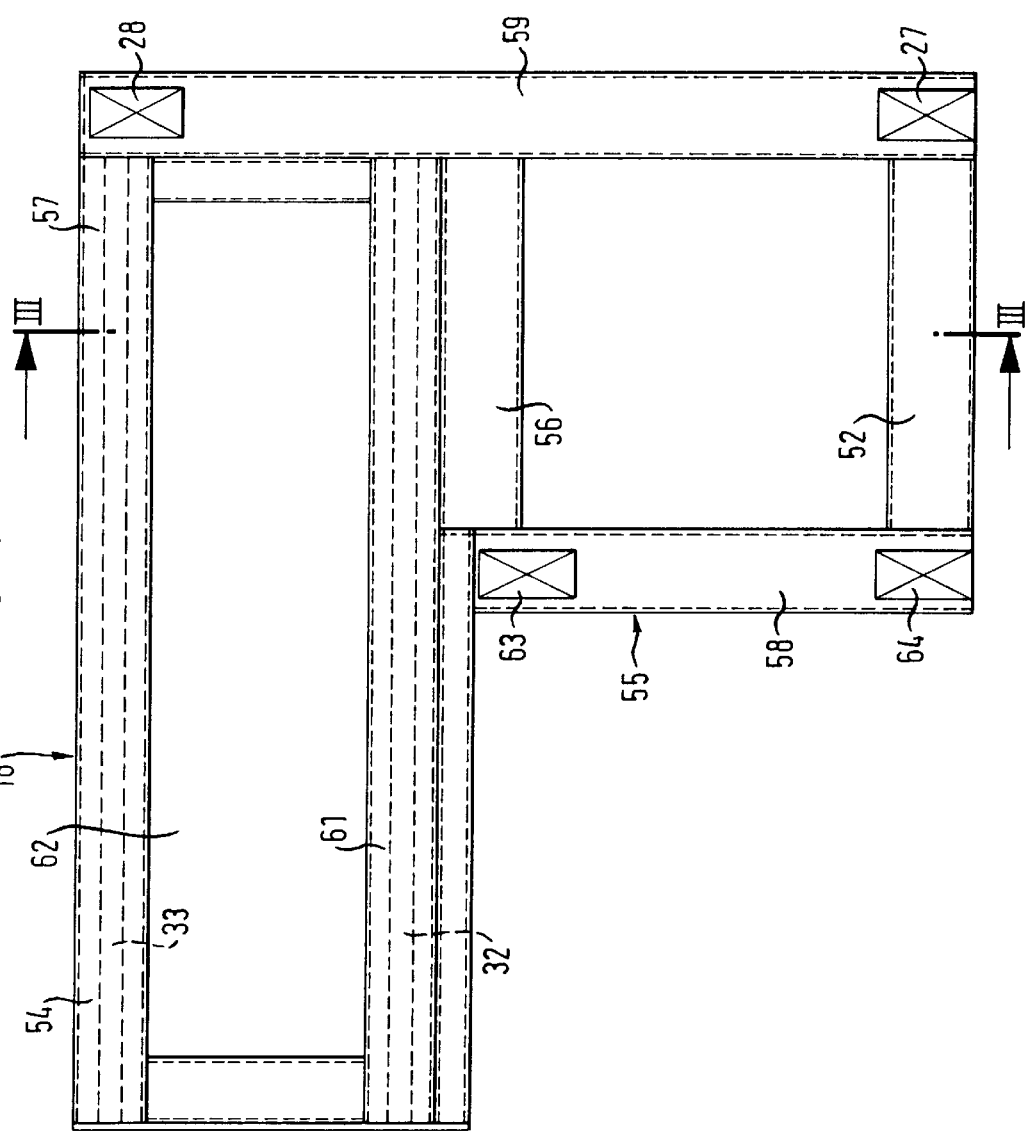

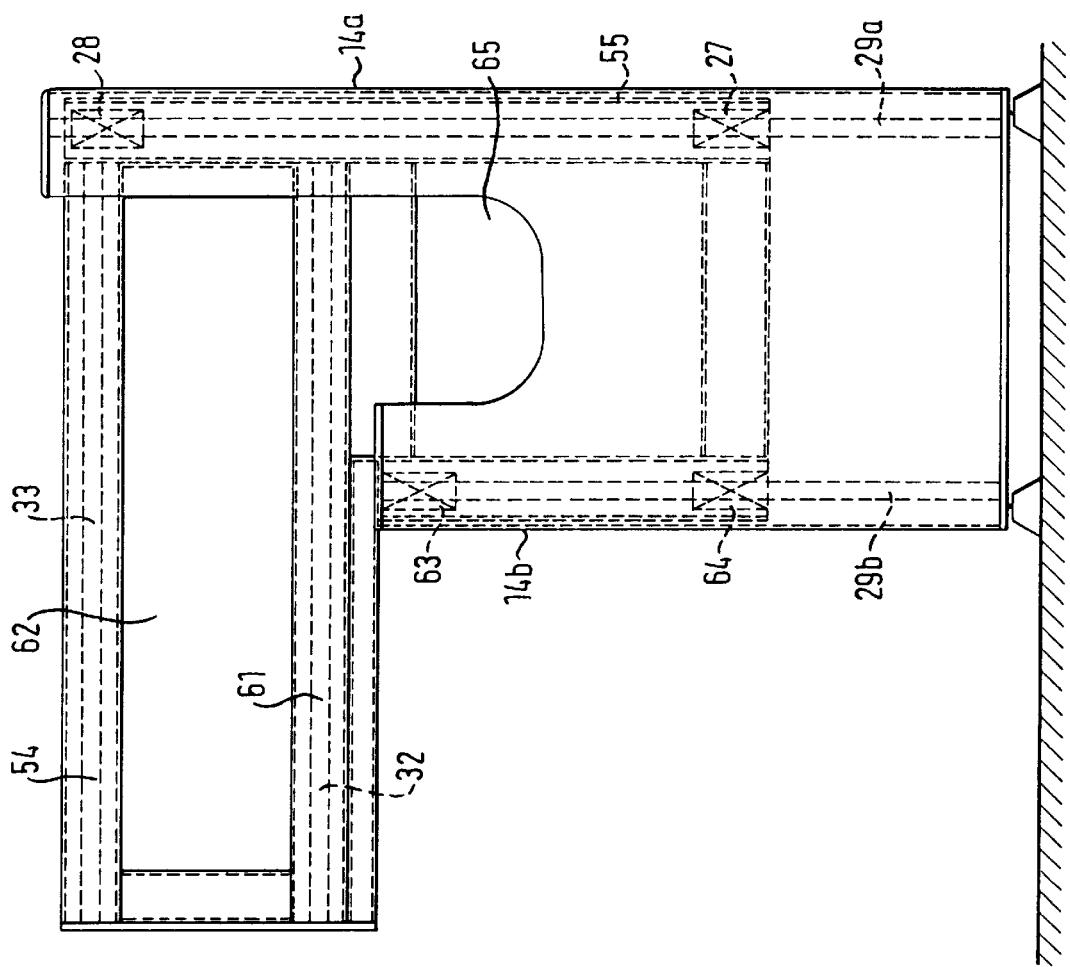

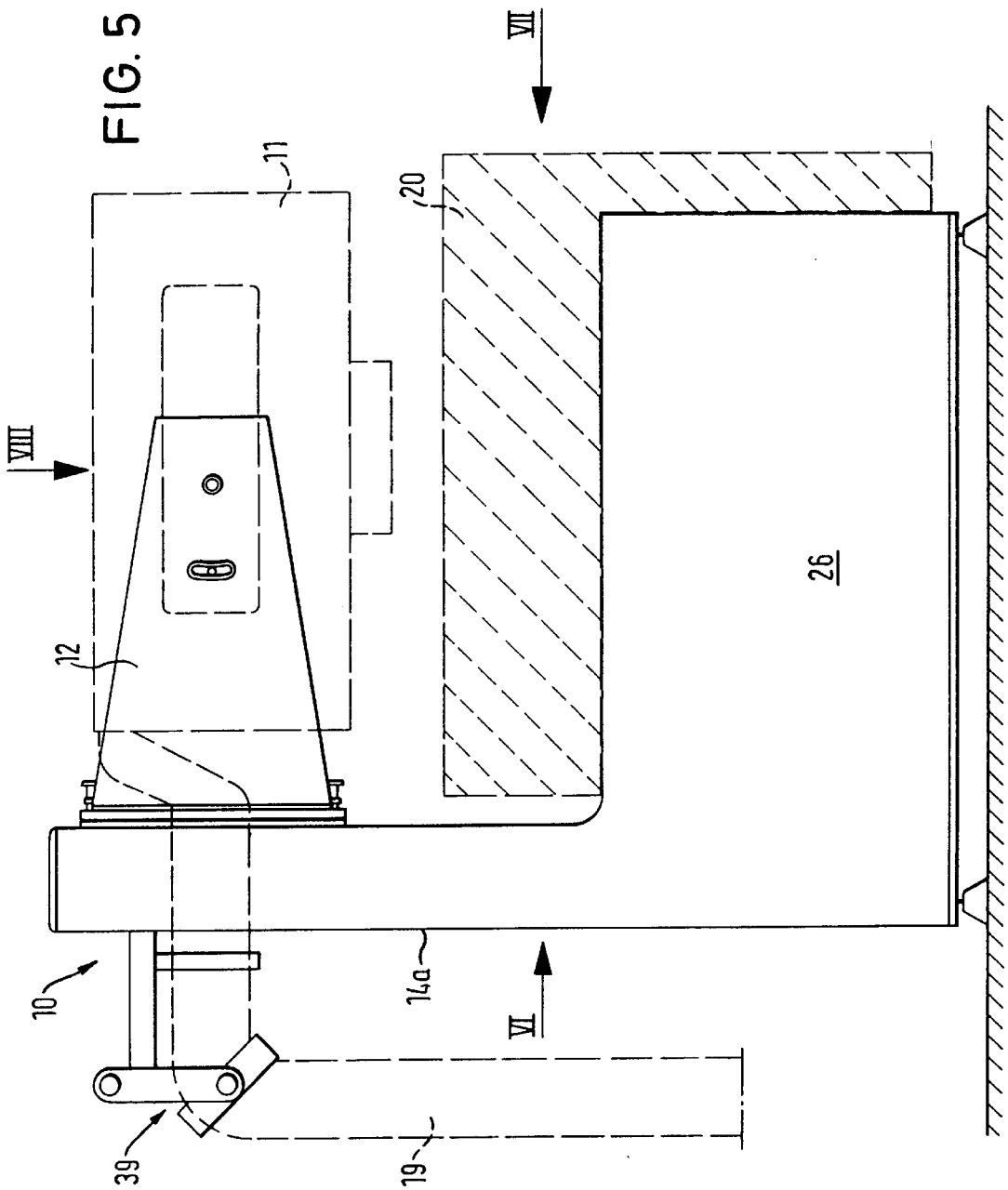

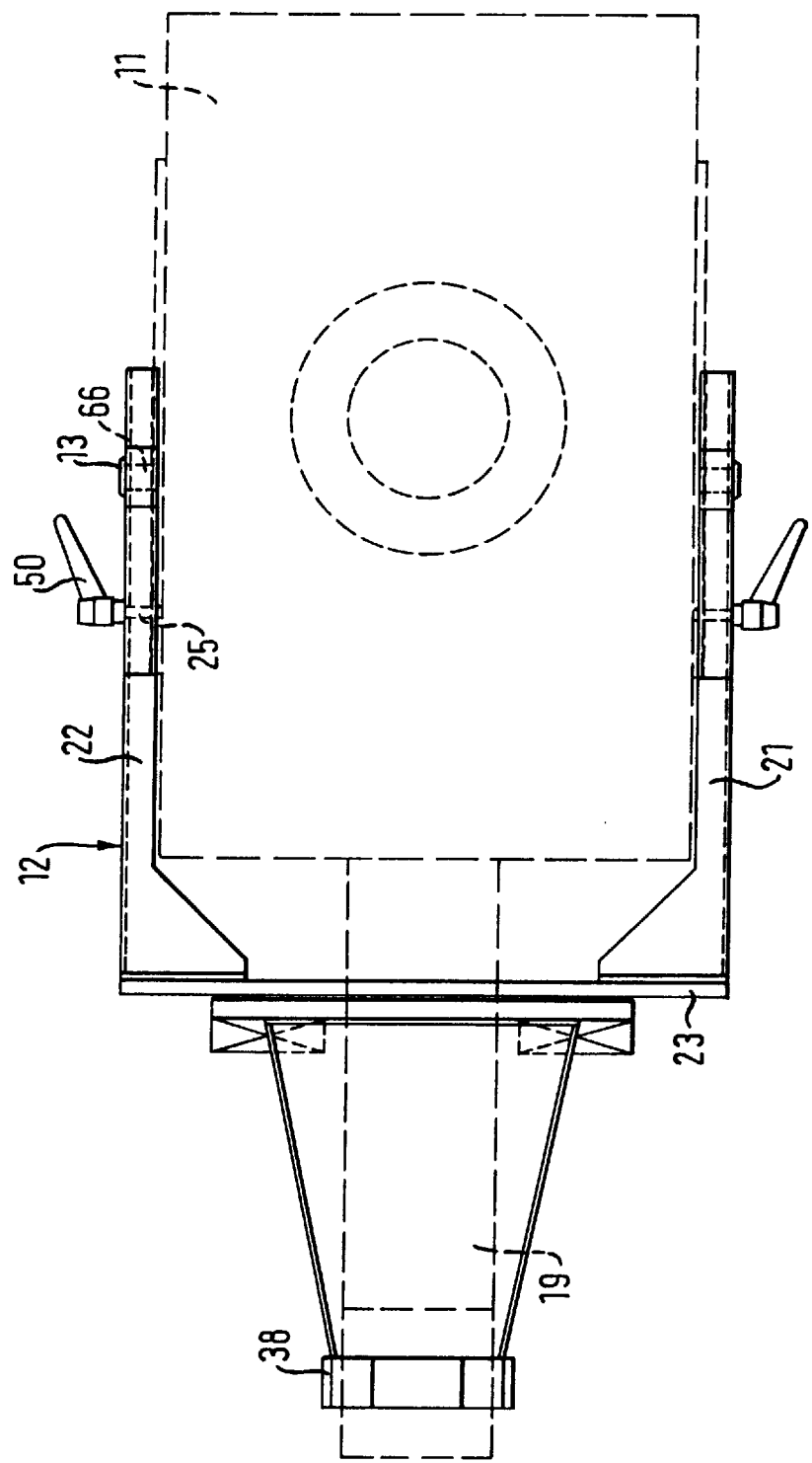

HANDLING DEVICE

BACKGROUND OF THE INVENTION

FIELD OF THE INVENTION

The invention relates to a handling device, in particular for handling probes of a wafer testing device, having a receiving device for a probe being disposed in such a way as to be adjustable in a vertical direction and in a horizontal direction relative to at least one vertical bearer, and a counterweight device for counterbalancing the weight of the probe and the receiving device.

A handling device for a probe is known from German Patent DE-36 17 741 C2. The known handling device includes a stationary housing, on which a vertically adjustable receiving device is provided that has horizontally aligned forks used to receive a probe. The receiving device for the probe, together with a threaded spindle, is supported in a height-adjustable manner on the stationary housing. In order to enable weight-relieved adjustment, the known handling device includes a counterweight device. The counterweight device is constructed with a lifting block which includes a counterbalance.

In the case of use with known wafer testing devices, it is desirable for the probe to be adjustable in all directions relative to the wafer testing device. Furthermore, during adjustment, a high dimensional accuracy and smooth running are required. Since such wafer testing devices are used in pure air chambers, a low spatial requirement is desirable.

SUMMARY OF THE INVENTION

It is accordingly an object of the invention to provide a handling device, which overcomes the hereinaforementioned disadvantages of the heretofore-known devices of this general type, which enables the probe to be adjustable in all directions relative to a wafer testing device with high dimensional accuracy and smooth running and which has a low spatial requirement.

With the foregoing and other objects in view there is provided, in accordance with the invention, a handling device, in particular for handling probes of wafer testing devices, comprising at least one vertical bearer; a supporting part being guided adjustably in a vertical direction on the at least one vertical bearer; a receiving device for the probe, the receiving device being guided adjustably in a horizontal direction on the supporting part, for adjusting the receiving device in a vertical direction and in a horizontal direction relative to the at least one vertical bearer; guide pulleys; a connector being turned around the guide pulleys and connected to the supporting part; and a counterweight device for counterbalancing the weight of the probe, the receiving device and the supporting part, the counterweight device having counterbalance weights, and a carrying device for receiving the counterbalance weights, the carrying device being aligned horizontally and having at least three suspension devices for parallel motion and for fixing the connector.

In the handling device according to the invention, the dimensionally accurate control of the probe relative to the wafer testing device is achieved by relieving the adjustably disposed parts of weight. Thus, during adjustment the entire weight of the adjustable parts need not be moved. As a result, the handling device according to the invention is also extremely safe. Although adjustability in all directions is possible, the handling device according to the invention only has a low spatial requirement. This is advantageous because such handling devices are used in pure air chambers. Adjustment of the probe may be effected with high dimensional accuracy and smooth running over a wide operating range. By virtue of the special refinement of the counterweight device with a carrying device for counterbalance weights it is possible, with a low overall height, to distribute a great deal of weight over a large surface area.

In accordance with another feature of the invention, the carrying device includes two parallel carrying plates which are connected to one another. A plurality of counterbalance weights may be inserted into the carrying device, in dependence upon the total weight arising.

In accordance with a further feature of the invention, the connector takes the form of toothed belts.

In accordance with an added feature of the invention, the counterweight device includes two parallel, spaced-apart axles, on which symmetrically disposed guide pulleys are provided.

In accordance with an additional feature of the invention, the counterweight device is disposed in a base housing, from which two spaced-apart vertical bearers vertically project.

In accordance with yet another feature of the invention, a particularly easy and reliable adjustment of the probe is achieved if a drive for adjusting the receiving device is associated with the supporting part or the counterweight device.

In accordance with yet a further feature of the invention, the drive is an electronic or a pneumatic drive. A drive may be provided both for the vertical motion and for the horizontal motion.

In accordance with yet an added feature of the invention, the drive is an electric drive which cooperates with a guide pulley for the connector.

In accordance with yet an additional feature of the invention, a step control is associated with the electric drive for permitting a dimensionally accurate adjustment of the probe.

In accordance with again another feature of the invention, the supporting part has a substantially L-shaped basic shape, with a recess for receiving the receiving device being provided in a horizontal limb. The supporting part advantageously takes the form of a lightweight welded structure having horizontal and vertical bearers. In that way, a low overall weight is achieved.

In accordance with again a further feature of the invention, the receiving device is disposed on the supporting part in such a way as to be rotatable about its longitudinal axis. The receiving device is advantageously supported on the supporting part through the use of a pivot bearing, having an inner opening through which the cable loom of the probe is run.

In accordance with again an added feature of the invention, the receiving device includes an end annular plate which is connected by the pivot bearing to the supporting part.

In accordance with again an additional feature of the invention, the receiving device includes at least one manually operable detent pin, which cooperates with the supporting part and through the use of which the rotational position of the receiving device relative to the supporting part is fixable.

In accordance with still another feature of the invention, the probe is held in such a way as to be capable of swivelling about its transverse axis on the receiving device.

In accordance with still a further feature of the invention, the probe is provided with laterally projecting journals which engage into an associated receiver at the forks of the receiving device, and the forks have an oblong recess into which a pilot pin connected to the probe engages. The pilot pin may advantageously be provided with a clamp for fixing the swivel position of the probe.

In accordance with still an added feature of the invention, the cable loom of the probe is received at a retaining ring which is supported in such a way as to be capable of swivelling on a rocker. In that way, a decoupling of the cable loom is achieved.

In accordance with still an additional feature of the invention, the rocker includes rocker bars, which laterally hold the retaining ring and are supported in such a way as to be capable of swivelling on supporting arms, that project from the receiving device. Alternatively, it is possible to provide a longitudinal guide for length compensation.

In accordance with another feature of the invention, in order to achieve a further support, the cable loom is held by a further support between the retaining ring and the probe.

In accordance with a further feature of the invention, the cable loom is run through a receiving ring which firmly clamps the cable loom in the region of the probe.

In accordance with an added feature of the invention, an intermediate support for the cable loom is provided between the receiving ring and the swivelling retaining ring.

In accordance with an additional feature of the invention, the receiving device includes linear bearings which cooperate with horizontal rails provided on the supporting part.

In accordance with yet another feature of the invention, the supporting part includes linear bearings which cooperate with vertical rails provided on the vertical bearers.

In accordance with yet a further feature of the invention, the supporting part has a substantially L-shaped basic shape and is guided at its short limbs on the vertical bearers, and the inner vertical bearer is shorter than the outer vertical bearer.

Other features which are considered as characteristic for the invention are set forth in the appended claims.

Although the invention is illustrated and described herein as embodied in a handling device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a plan view of a supporting part of the handling device according to FIG. 1;

FIG. 3 is a sectional view taken along a line III—III of FIG. 2, in the direction of the arrows;

FIG. 4 is an elevational view of the supporting part according to FIG. 2 in an installed state on vertical bearers of a base housing;

FIG. 5 is a side-elevational view of the handling device in combination with a wafer testing device;

FIG. 11 is a plan view of a portion of the receiving device with an inserted probe.

DESCRIPTION OF THE PREFERRED EMBODIMENT

Figure 1:
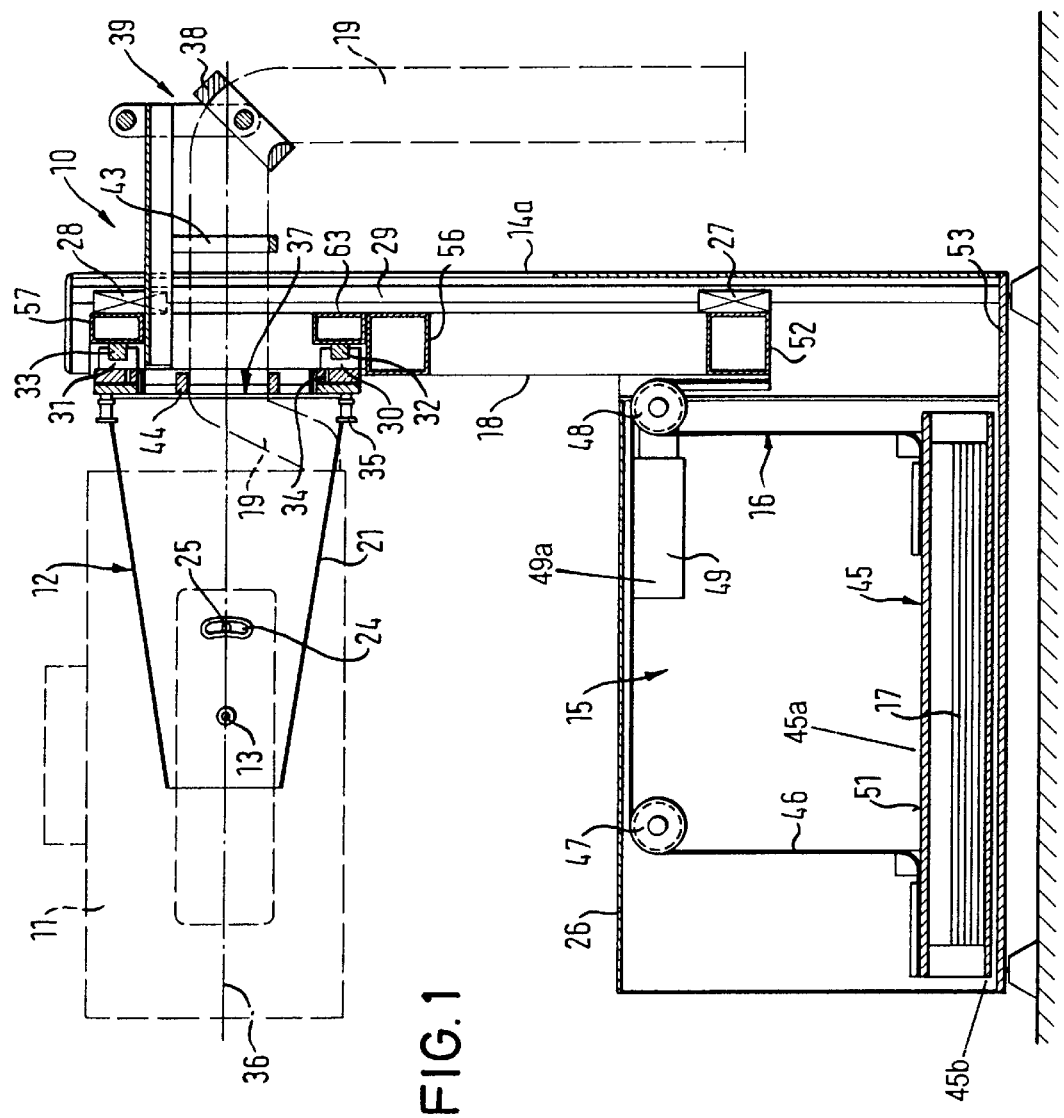
FIG. 1 is a diagrammatic, vertical-sectional view of a handling device according to the invention with an inserted probe.
Figure 6:
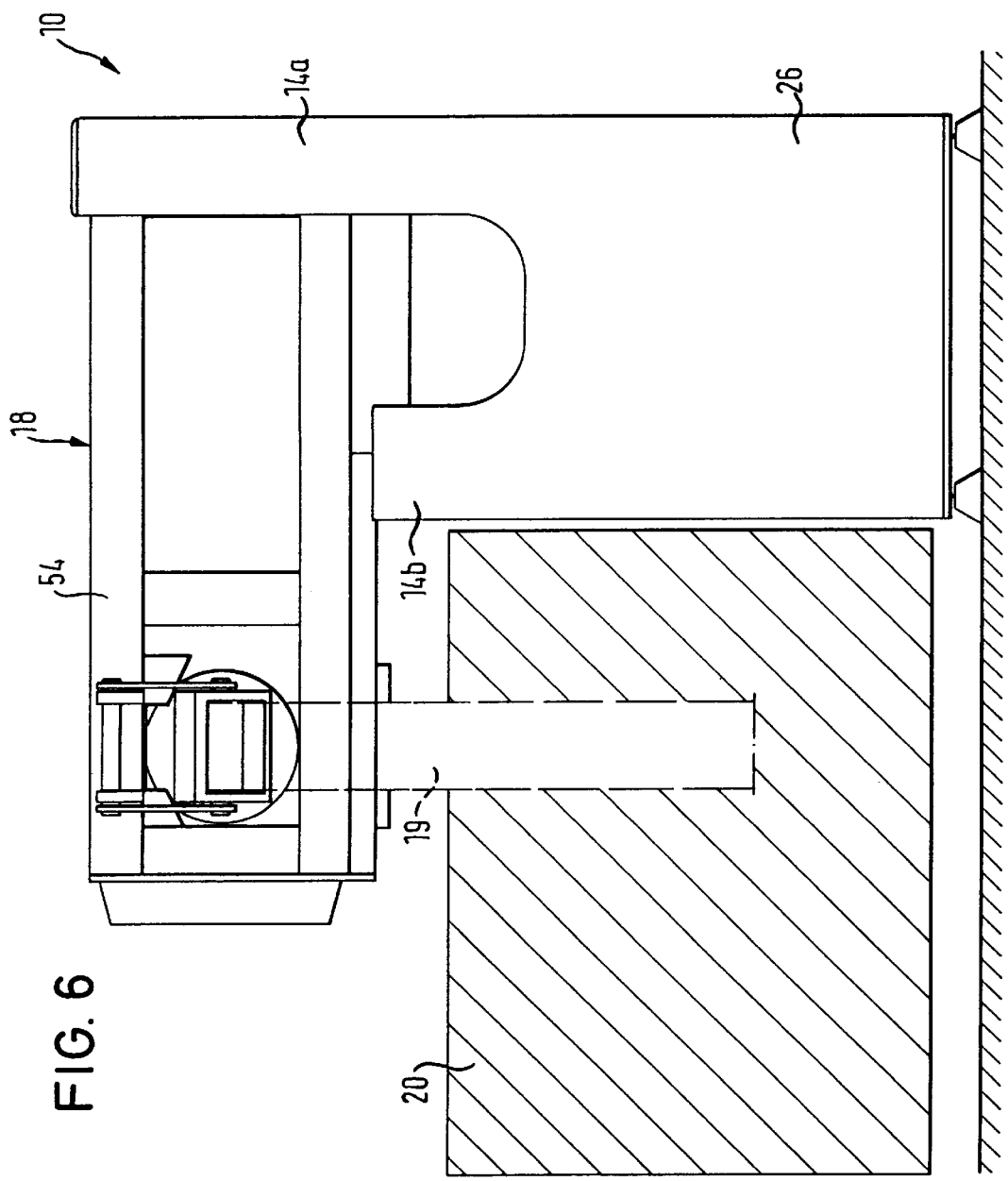
FIG. 6 is an elevational view as seen in the direction of an arrow VI according to FIG. 5.

Referring now to the figures of the drawings in detail and first, particularly, to FIG. 1 thereof, there is seen a diagrammatic, vertical section through a handling device 10 according to the invention, wherein a probe 11 has been inserted into a receiving device 12 of the handling device. Such a handling device 10 is used in a wafer testing device 20 which is illustrated diagrammatically in FIGS. 5 to 8. In that case, the handling device 10 is disposed laterally of the wafer testing device 20 so that the probe 11 may be moved through the use of the handling device 10 relative to the wafer testing device 20.

As FIG. 1 reveals, the probe 11 is held on a receiving device 12, the construction of which is evident from the plan view according to FIG. 11. The receiving device 12 has lateral forks 21, 22 which are connected to one another by an end plate 23. The probe 11 is provided with laterally projecting journals 66 which engage into an associated receiver on the forks 21, 22. The probe 11 is held on the horizontally aligned forks 21, 22 in such a way as to be capable of swivelling at a pivot bearing 13. In order to delimit the swivelling motion about the pivot bearing 13, the forks 21, 22 are provided with an oblong recess 24 and a pilot pin 25 engages in the recess 24 and is connected to the probe 11. A clamping device 50 is associated with the pilot pin 25 for fixing the swivel position of the probe 11. A more detailed description of the refinement of the receiving device 12 is provided in connection with FIG. 11.

The receiving device 12 is fixed on a supporting part 18, which is guided in such a way as to be displaceable in a vertical direction on vertical bearers 14a, 14b, that are best seen in FIG. 4. The vertical bearers 14a, 14b project vertically from a base housing 26, in which a counterweight device 15 is disposed. In the present case, the vertical bearers 14a, 14b are in the form of hollow bearers which receive the supporting part 18. To that end, linear bearings 27, 28 are provided on the supporting part 18 and cooperate with vertical rails 29 disposed on the vertical bearers 14a, 14b. The supporting part 18 has horizontal rails 32, 33, which are aligned in parallel and into which linear bearings 30, 31 of the receiving device 12 engage.

Thus, the receiving device 12 and the probe 11 connected thereto are disposed in such a way as to be displaceable both in a horizontal direction and in a vertical direction.

The receiving device 12 for the probe 11 is supported in such a way as to be rotatable about a longitudinal axis 36 through the use of a pivot bearing 34. In the present case, the rotational position of the receiving device 12 is fixable through the use of detent pins 35. The pivot bearing 34 is of annular construction and has an inner opening 37, through which a cable loom 19 of the probe 11 is run. The cable loom 19 is received at a retaining ring 38 which is disposed in such a way as to be capable of swivelling on a rocker 39. As FIG. 9 reveals, the rocker 39 includes rocker bars 41, 42, which laterally hold the retaining ring 38 and are supported in such a way as to be capable of swivelling on a supporting arm 40. In the region of the inner opening 37, the cable loom 19 is firmly clamped at a receiving ring 44. An intermediate support 43 for the cable loom 19 is provided between the receiving ring 44 and the retaining ring 38 and is disposed in such a way as to be capable of swivelling.

The counterweight device 15 is disposed in the base housing 26 as mentioned above. The counterweight device 15 is used to counterbalance the weight of the probe 11, the receiving device 12 and the supporting part 18. The counterweight device 15 includes counterbalance weights 17 which are disposed in a carrying device 45. As is evident from the drawing, a plurality of the counterbalance weights 17 are disposed one on top of the other between the two carrying plates 45a and 45b of the carrying device 45. Toothed belts 46 of a belt configuration 16 are disposed at an upper surface 51 of the carrying device 45. The toothed belts 46 are connected by guide pulleys 47, 48 having parallel axles to a bottom transverse bearer 52 of the supporting part 18.

Figure 10:
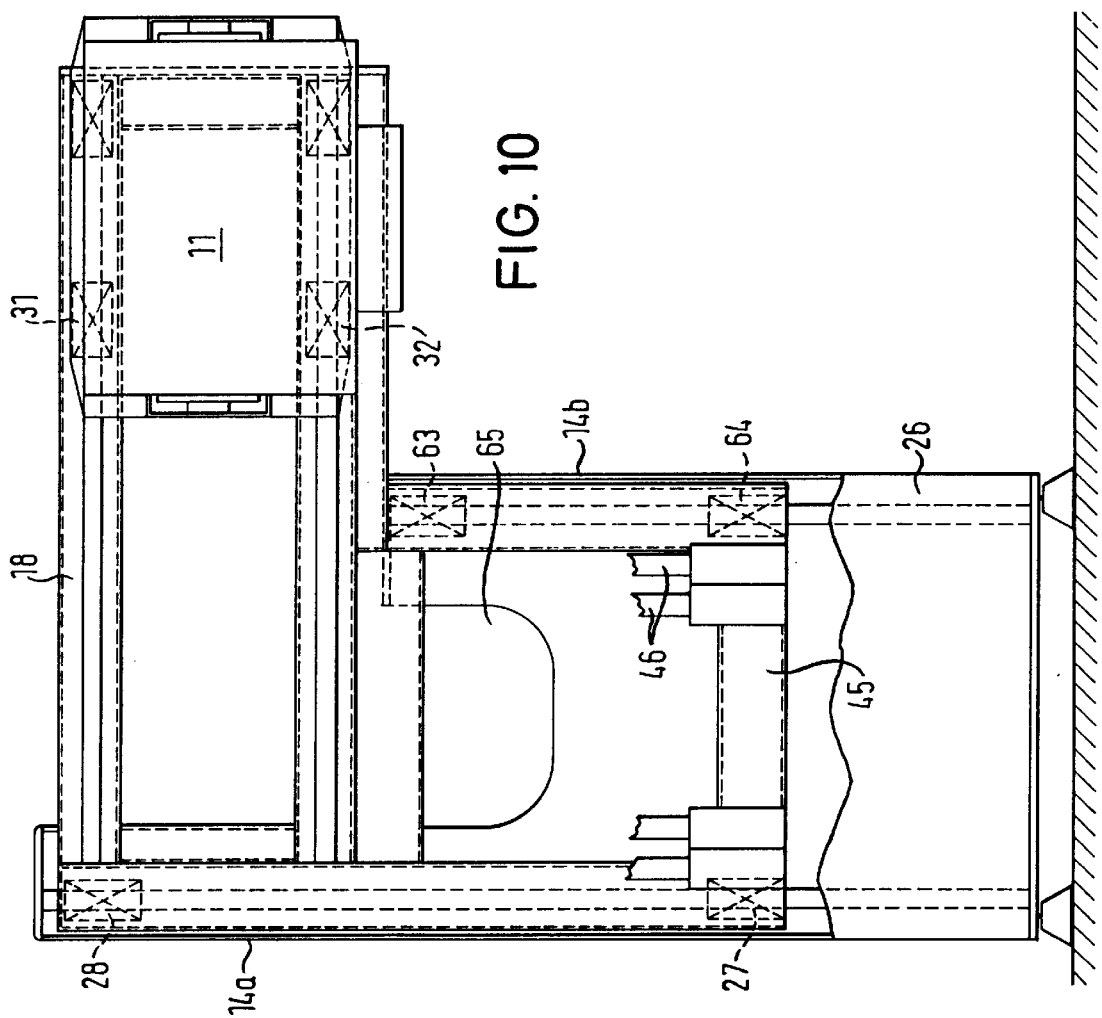
FIG. 10 is a partly broken-away front-elevational view with illustrated horizontal and vertical guides.

As FIG. 10 reveals, in each case the toothed belts 46 are disposed in pairs at side regions of the carrying device 45. Accordingly, guide pulleys which are disposed in pairs are also provided for the toothed belts. An electric drive 49 is associated with the guide pulley 48. The electric drive 49 is controlled through the use of a step control 49a so that the probe 11 may be moved precisely.

Alternatively, a pneumatic cylinder may be coupled to the bottom transverse bearer 52 of the supporting part 18 and connected at its other end to a base plate 53 of the base housing 26, as a drive.

A detailed description of the refinement of the supporting part 18 follows below with reference to FIGS. 2 and 3. As FIG. 2 reveals, the supporting part 18 has a substantially L-shaped basic shape. In the present case, a horizontal limb 54 and a vertical limb 55 are provided. The supporting part 18 has transverse bearers 52, 56, 57 aligned in parallel. In the present case, the transverse bearers 52, 56 are received between vertical bearers 58, 59. A recess 62 is introduced in the region of the horizontal limb 54. The recess 62 is used to support the receiving device 12 and to run through the cable loom 19 of the probe 11.

A further transverse bearer 63 is fixed to the top of the transverse bearer 56. The horizontal rails 32, 33 are fastened to the transverse bearer 63 and to the transverse bearer 57 disposed parallel thereto. The linear bearings 30, 31 of the receiving device 12 are associated with the horizontal rails 32, 33.

As FIG. 2 reveals, the linear bearings 27, 28 are spaced apart from one another on the vertical bearer 59. The linear bearings 63, 64 are fixed on the vertical bearer 58.

FIG. 4 shows a plan view of the supporting part 18 in the installed state on the vertical bearers 14a, 14b. As the drawing reveals, the vertical bearer 14a has a longer length than the vertical bearer 14b. The vertical limb 55 of the supporting part 18 is introduced into the vertical bearers 14a, 14b. In the present case, the linear bearings 27, 28, 63, 64 are guided on associated vertical rails 29a, 29b of the vertical bearers. This configuration guarantees precise guidance of the supporting part 18 in a vertical direction. The horizontal rails 32, 33 for the horizontal displacement of the receiving device 12 are provided on the horizontal limb 54 of the supporting part 18.

The vertical limbs 14a, 14b are covered at their front and rear sides by non-illustrated cover plates. A substantially semi-circular recess 65 is introduced in the cover plates and, in one end position of the receiving device 12, it enables a deep downward movement of the probe.

FIGS. 5 to 8 show the configuration of the handling device 10 next to the wafer testing device 20. It is evident that the base housing 26 of the handling device 10 is set immediately adjacent the wafer testing device 20. It is evident from FIGS. 6, 7 and 8 that the horizontal limb 54 of the supporting part 18 is disposed above the wafer testing device 20. Thus, the receiving device 12 with the probe 11 may be moved as far as into a central region of the wafer testing device 20.

Figure 7:
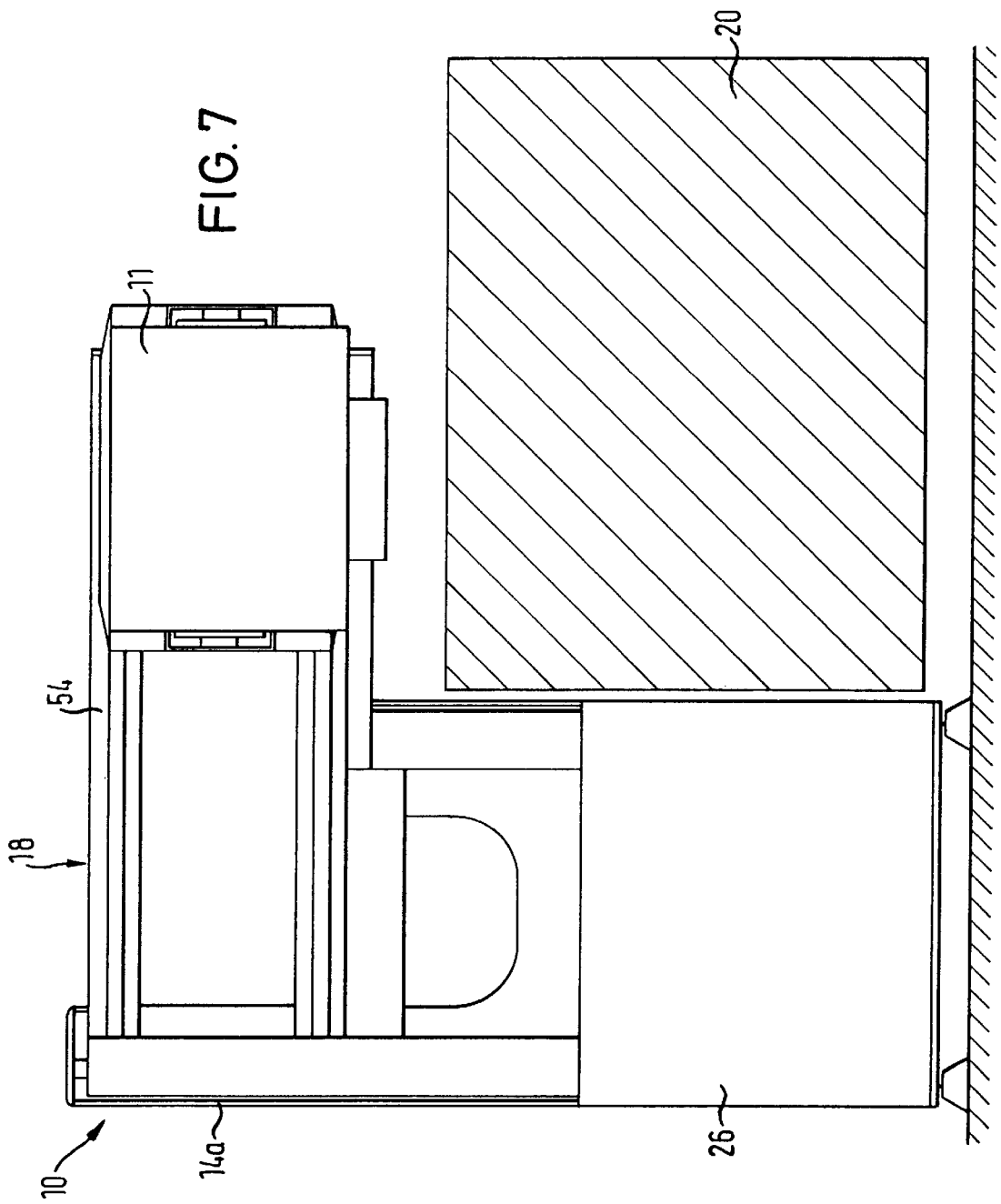
FIG. 7 is an elevational view as seen in the direction of an arrow VII according to FIG. 5.
Figure 8:
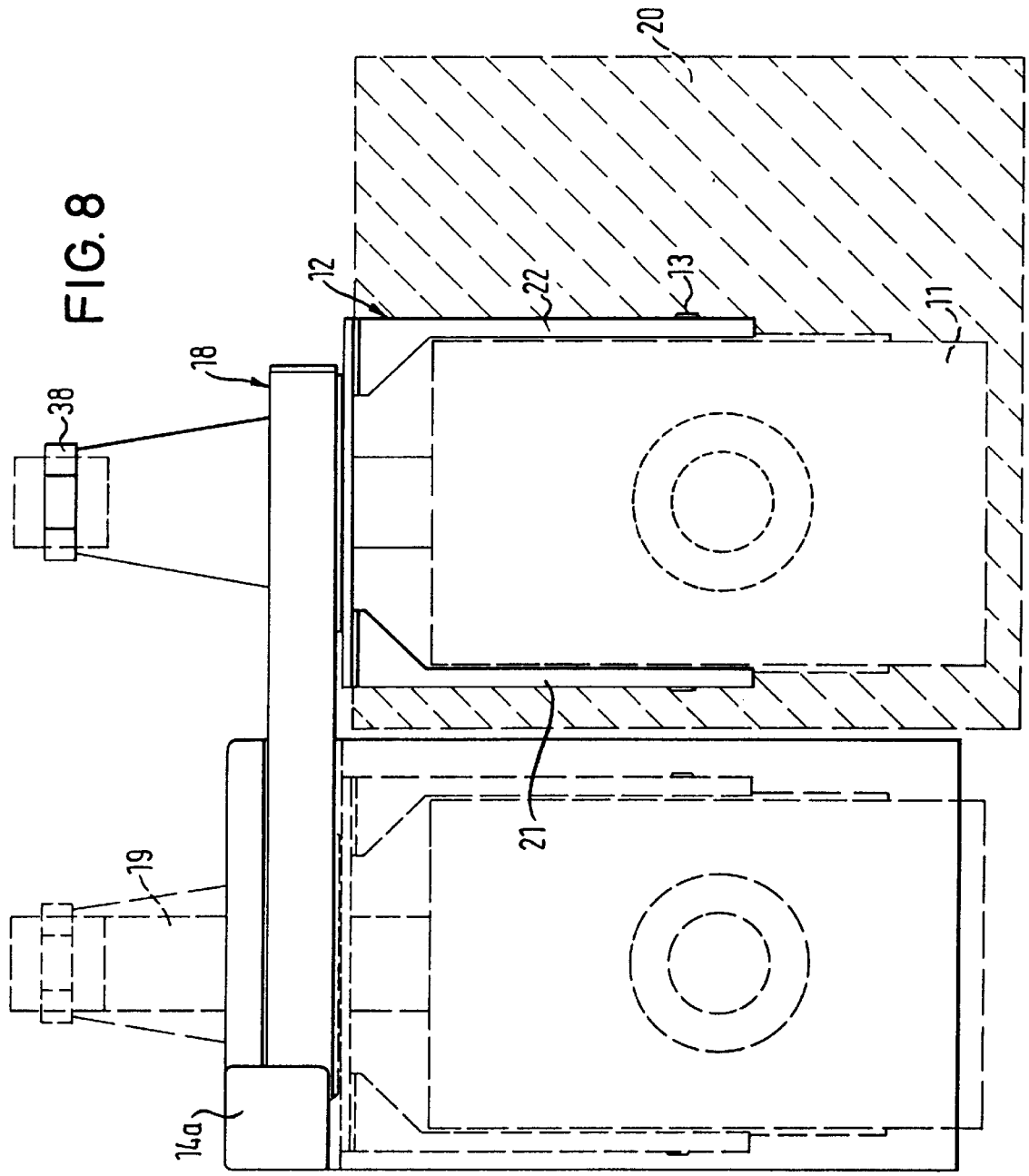
FIG. 8 is a plan view as seen in the direction of an arrow VIII according to FIG. 5.

It is apparent from FIGS. 7 and 8 that the receiving device 12 together with the probe 11 is displaceable in a horizontal direction. In the process, the receiving device 12 is guided by its linear bearings 30, 31 on the horizontal rails 32, 33 provided on the supporting part.

Figure 9:
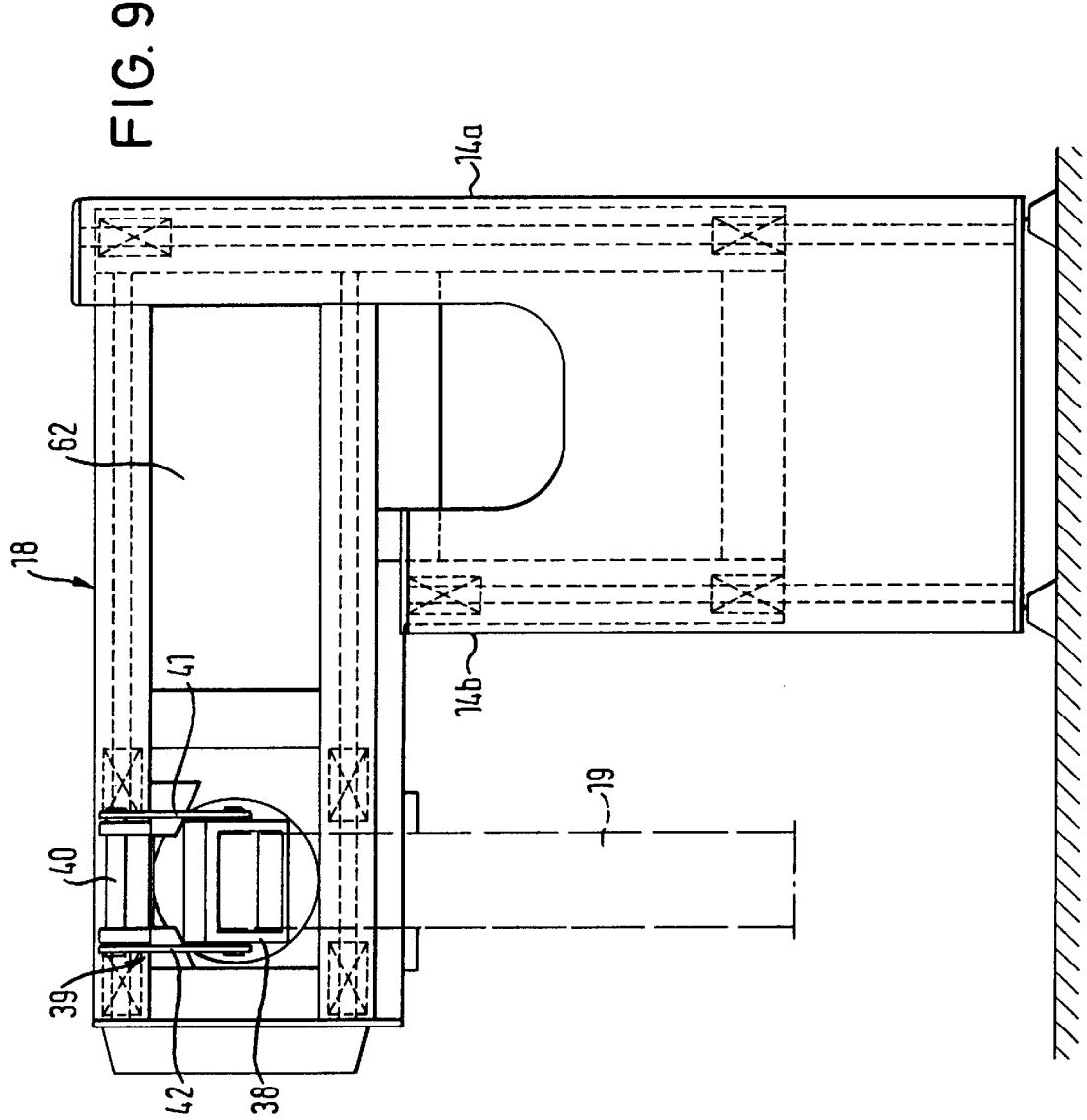
FIG. 9 is a rear-elevational view of the handling device according to the invention with diagrammatically illustrated horizontal and vertical guides.

FIGS. 9 and 10 diagrammatically illustrate the configuration of the linear bearings for the horizontal and vertical displacement.

FIG. 11 shows a plan view of the receiving device 12 for the probe 11. The receiving device 12 has the forks 21, 22, which are spaced apart from one another and on which the pivot bearing 13 for the probe 11 is constructed. The forks 21, 22 are connected to one another by the end plate 23. The cable loom 19 is run through the end plate 23 to the swivelling retaining ring 38. FIG. 11 also shows the clamping device 50 for fixing the swivel position of the probe 11.

A description of the mode of operation of the handling device 10 follows below.

The handling device 10 is used particularly with the wafer testing device 20. In that case, the handling device 10 is disposed immediately adjacent the wafer testing device 20. The probe 11 is disposed on the receiving device 12 of the handling device 10. The receiving device 12 and the probe 11 are displaceable both in a horizontal direction and in a vertical direction relative to the wafer testing device. Furthermore, the probe 11 is supported rotatably about the longitudinal axis 36, with the rotational position being fixable through the use of the manually operable detent pins 35. The probe 11 is moreover supported rotatably about its transverse axis, with the swivelling motion being delimited by the pilot pins 25. The swivel position of the probe 11 may be fixed through the use of the clamping device 50 associated with the pilot pins 25.

By virtue of the counterweight device 15 with the counterbalance weights 17, it is possible to counterbalance the weight of the probe 11, the receiving device 12 and the supporting part 18. This is achieved by inserting the counterbalance weights 17 into the carrying device 45. Thus, the supporting part 18 and the parts connected thereto are relieved of weight, with the result that only low forces are required for adjustment. That refinement is moreover advantageous for safety reasons since only low forces are needed for adjustment.

Adjustment of the supporting part 18 and the parts connected thereto is effected through the use of the electric drive 49 and the incremental encoder connected thereto. In that way, a very precise displacement of the probe 11 is possible.

The horizontal displacement of the receiving device 12 on the horizontal limb 54 may be effected manually or through the use of a further drive. During horizontal displacement, the receiving device 12 is guided by its linear bearings 31, 32 on the associated horizontal rails 32, 33 of the supporting part 18.

The pivot bearing 34 allows the receiving device 12 to rotate about its longitudinal axis 36. In order to enable rotation, it is first necessary to release the manually operable detent pins 35. During rotation of the receiving device 12, the cable loom 19 is decoupled through the use of the retaining ring 38 which is disposed in such a way as to be capable of swivelling. The effect which is thereby achieved is that defined torsional forces arise.

Precise displacement of the probe 11 is possible with a high degree of safety by virtue of the constructional refinement and the provision of a counterweight device. Furthermore, the handling device 10 has a very low spatial requirement which is advantageous for operation in the pure air region.

I claim:

1. A handling device, comprising:
   a probe;
   at least one vertical bearer;
   a supporting part being guided adjustably in a vertical direction on said at least one vertical bearer, and said supporting part having horizontal rails;
   a receiving device for said probe mounted on said supporting part, said receiving device having linear bearings for engaging said horizontal rails of said supporting part and being guided adjustably in a horizontal direction on said horizontal rails of said supporting part;
   guide pulleys;
   a connector being turned around said guide pulleys and connected to said supporting part; and
   a counterweight device for counterbalancing the weight of said probe, said receiving device and said supporting part, said counterweight device having counterbalance weights, and a carrying device for receiving said counterbalance weights.

2. The handling device according to claim 1, wherein said carrying device includes two carrying plates being aligned horizontally in parallel and connected to one another.

3. The handling device according to claim 1, wherein said connector includes toothed belts.

4. The handling device according to claim 1, wherein said counterweight device includes two parallel axles on which said guide pulleys are symmetrically disposed.

5. The handling device according to claim 1, including a base housing in which said counterweight device is disposed, said at least one vertical bearer being two spaced-apart vertical bearers projecting vertically from said base housing.

6. The handling device according to claim 1, including a drive being associated with said counterweight device for adjusting said receiving device.

7. The handling device according to claim 6, wherein said drive is an electric drive cooperating with one of said guide pulleys for said connector.

8. The handling device according to claim 7, including a step control associated with said electric drive.

9. The handling device according to claim 1, including a drive being associated with said supporting part for adjusting said receiving device.

10. The handling device according to claim 9, wherein said drive is an electric drive cooperating with one of said guide pulleys for said connector.

11. The handling device according to claim 10, including a step control associated with said electric drive.

12. The handling device according to claim 1, wherein said supporting part has a substantially L-shaped basic shape with a horizontal limb having a recess formed therein for receiving said receiving device.

13. The handling device according to claim 12, wherein said receiving device has a longitudinal axis and is rotatable about the longitudinal axis on said supporting part.

14. The handling device according to claim 13, including a pivot bearing supporting said receiving device on said supporting part, said pivot bearing having an inner opening, and said probe having a cable loom passing through said inner opening.

15. The handling device according to claim 14, wherein said receiving device has an annular end plate being connected by said pivot bearing to said supporting part.

16. The handling device according to claim 14, wherein said receiving device includes at least one manually operable detent pin cooperating with said supporting part for fixing a rotational position of said receiving device relative to said supporting part.

17. The handling device according to claim 1, wherein said probe has a transverse axis and is held on said receiving device for swivelling about said transverse axis.

18. The handling device according to claim 17, wherein said receiving device includes forks having a receiver disposed thereon and having an oblong recess formed therein, said probe has laterally projecting journals engaging into said receiver, and including pilot pins being connected to said probe for engagement into said oblong recess.

19. The handling device according to claim 1, including a rocker, and a retaining ring being supported for swivelling on said rocker, said probe having a cable loom received at said retaining ring.

20. The handling device according to claim 19, including supporting arms projecting from said receiving device, said rocker having rocker bars laterally holding said retaining ring and being supported for swivelling on said supporting arms.

21. The handling device according to claim 19, including a intermediate support for holding said cable loom between said retaining ring and said probe.

22. The handling device according to claim 19, including a receiving ring in the vicinity of said probe, said cable loom passing through and being firmly clamped by said receiving ring.

23. The handling device according to claim 22, including an intermediate support for said cable loom being disposed between said receiving ring and said swivelling retaining ring.

24. The handling device according to claim 1, wherein said at least one vertical bearer has vertical rails, and said supporting part has linear bearings cooperating with said vertical rails.

25. The handling device according to claim 1, wherein said at least one vertical bearer includes an outer vertical bearer and an inner vertical bearer being shorter than said outer vertical bearer, said supporting part having a substantially L-shaped basic shape with a vertical limb being guided on said vertical bearers.

26. The handling device according to claim 1, wherein said probe is part of a wafer testing device.

27. A handling device, comprising:
   a probe having a cable loom;
   at least one vertical bearer;
   a supporting part being guided adjustably in a vertical direction on said at least one vertical bearer, and said supporting part having horizontal rails and a pivot bearing;
   a receiving device for securing said probe mounted to said pivot bearing, said receiving device being rotatable around a vertical axis via said pivot bearing, said receiving device having linear bearings for engaging said horizontal rails of said supporting part and being guided adjustably in a horizontal direction on said horizontal rails of said supporting part;

said pivot bearing having an opening formed therein for receiving said cable loom;

a rocker connected to said supporting part;

a retaining ring swivably mounted on said rocker and also receiving said cable loom; and a counterweight device for counterbalancing the weight of said probe and said receiving device.

* * * * *